US008923606B2

(12) United States Patent
Wu et al.

(10) Patent No.: US 8,923,606 B2
(45) Date of Patent: Dec. 30, 2014

(54) SYSTEM AND METHOD FOR IDENTIFYING AN APERTURE IN A REPRESENTATION OF AN OBJECT

(71) Applicants: Wen-Jun Wu, Novi, MI (US); Joseph A Cilluffo, Sterling Heights, MI (US); Bo Robert Zhou, Bloomfield Hills, MI (US)

(72) Inventors: Wen-Jun Wu, Novi, MI (US); Joseph A Cilluffo, Sterling Heights, MI (US); Bo Robert Zhou, Bloomfield Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 116 days.

(21) Appl. No.: 13/735,199

(22) Filed: Jan. 7, 2013

(65) Prior Publication Data
US 2013/0177234 A1    Jul. 11, 2013

Related U.S. Application Data

(60) Provisional application No. 61/584,429, filed on Jan. 9, 2012, provisional application No. 61/607,270, filed on Mar. 6, 2012.

(51) Int. Cl.
*G06K 9/00* (2006.01)
(52) U.S. Cl.
CPC ........ *G06K 9/00208* (2013.01); *G06K 9/00201* (2013.01)
USPC ......................................... 382/154

(58) Field of Classification Search
None
See application file for complete search history.

(56) References Cited

U.S. PATENT DOCUMENTS

| | | | |
|---|---|---|---|
| 6,501,471 B1 | 12/2002 | Venkataraman et al. | |
| 6,647,306 B2 | 11/2003 | Wu et al. | |
| 6,674,430 B1 | 1/2004 | Kaufman et al. | |
| 6,968,299 B1 | 11/2005 | Bernardini et al. | |
| 6,990,228 B1 * | 1/2006 | Wiles et al. | 382/154 |
| 7,173,615 B2 | 2/2007 | Hux | |
| 7,299,684 B2 | 11/2007 | Wu et al. | |
| 2002/0151999 A1 | 10/2002 | Wu et al. | |
| 2005/0128195 A1 | 6/2005 | Houston et al. | |
| 2008/0297507 A1 | 12/2008 | Chen et al. | |

* cited by examiner

*Primary Examiner* — Daniel Mariam
(74) *Attorney, Agent, or Firm* — Ralph E Smith

(57) ABSTRACT

An iterative process for determining an aperture in a representation of an object is disclosed. The object is received and a bounding box corresponding thereto is determined. The bounding box includes a plurality of initial voxels and the object is embedded therein. An intersecting set of initial voxels is determined, as well as an internal set and an external set of initial voxels. The resolution of the voxels is iteratively decreased until the ratio of internal voxels to external voxels exceeds a predetermined threshold. The voxels corresponding to the final iteration are the final voxels. An internal set of final voxels is determined. A union set of initial voxels is determined indicating an intersection between the external set of initial voxels and the internal set of final voxels. From the union set of initial voxels and the external set of initial voxels, a location of an aperture is determined.

18 Claims, 11 Drawing Sheets

# SYSTEM AND METHOD FOR IDENTIFYING AN APERTURE IN A REPRESENTATION OF AN OBJECT

CROSS REFERENCE TO RELATED APPLICATIONS

This applications claims the benefit of U.S. Provisional Ser. No. 61/584,429, filed Jan. 9, 2012 and U.S. Provisional Ser. No. 61/607,270, filed Mar. 6, 2012.

FIELD OF THE INVENTION

The present disclosure relates to a system and method for identifying apertures in a representation of an object and generating a cover for the aperture.

BACKGROUND

Three dimensional (3D) representations of objects are used in many different fields. For instance, 3D representations of objects are used to design parts, e.g., computer-aided design (CAD) applications, and for performing analytical applications such as safety testing, vibration analysis, and computational fluid dynamics analysis. A 3D representation of an object is typically comprised of millions or tens of millions of triangles, where each triangle can be represented by 3 vertices, having three coordinates apiece. Each coordinate is typically represented by a floating point decimal, which is typically represented by 24 bits. Thus, a 3D representation of an object that is comprised of 10,000,000 triangles can take up to 2 GB to represent.

It is appreciated that representations of an object may include small holes or apertures at the surface of the representation. An issue arises when apertures are found at the surface of the representation because the outer surface may be continuously connected to the inner surface of the object via the aperture. Applications using the representation of the object to perform computationally expensive analysis may use the outer surface of the object to represent the object using less triangles. If, however, the inner surface and outer surface of an object are connected via an aperture, an application that is attempting to determine the outer surface of the object may inadvertently include the inner surface. Thus, there is a need for a mechanism by which an aperture on a representation of an object can be located and sealed.

SUMMARY

In an aspect of the disclosure, a method for identifying an aperture in a three-dimensional (3D) representation of an object is disclosed. The method comprises receiving a plurality of two-dimensional (2D) triangles representing the object and determining a 3D bounding box having dimensions sufficient to encapsulate the object, the 3D bounding box including a plurality of initial voxels. The initial voxels of the plurality each have equal initial dimensions. The method further comprises determining an initial intersecting set of initial voxels from the plurality of initial voxels. Each initial voxel of the initial intersecting set of initial voxels intersects with at least one of the plurality of 2D triangles. The method further comprises determining an initial external set of initial voxels from the plurality of initial voxels, the initial external set of initial voxels being exclusive from the initial intersecting set of initial voxels and not wholly encapsulated by voxels from the initial intersecting set of initial voxels. The method also includes determining a plurality of final voxels corresponding to the bounding box. Each of the plurality of final voxels have equal final dimensions. The method also includes determining a final intersecting set of final voxels from the plurality of final voxels. Each final voxel of the final intersecting set of final voxels intersects with at least one of the plurality of 2D triangles. The method further comprises determining a final internal set of final voxels from the plurality of final voxels, the final internal set of final voxels being exclusive from the final intersecting set of final voxels and wherein each final voxel of the final internal set of final voxels is wholly encapsulated by the final voxels of the final intersecting set of final voxels. The method also includes determining a union set of initial voxels from the plurality of initial voxels based on the initial external set of initial voxels and the final internal set of final voxels. An initial voxel of the union set of initial voxels intersects a final voxel of the final internal set of final voxels. The method also includes determining a location of the aperture by identifying initial voxels of the union set of initial voxels that share at least one face with at least one initial voxel of the initial external set of initial voxels.

In another aspect of the disclosure a system for identifying an aperture in a three-dimensional (3D) representation of an object is disclosed. The system comprises a bounding box determination module that receives a plurality of two-dimensional (2D) triangles representing the object, and that determines a 3D bounding box having dimensions sufficient to encapsulate the object, the 3D bounding box including a plurality of initial voxels. The initial voxels of the plurality each have same initial dimensions. The system further comprises a union set determination module that determines an initial intersecting set of initial voxels from the plurality of initial voxels, Each initial voxel of the initial intersecting set of initial voxels intersects with at least one of the plurality of 2D triangles. The union set determination module further determines an initial external set of initial voxels from the plurality of initial voxels, the initial external set of initial voxels being exclusive from the initial intersecting set of initial voxels and not wholly encapsulated by voxels from the initial intersecting set of initial voxels. The union set determination module further determines a plurality of final voxels corresponding to the 3D bounding box, wherein final voxels of the plurality of final voxels each have equal final dimensions. The union set determination module also determines a final intersecting set of final voxels from the plurality of final voxels. Each final voxel of the final intersecting set of final voxels intersects with at least one of the plurality of 2D triangles. The union set determination module further determines a final internal set of final voxels from the plurality of final voxels, the final internal set of final voxels being exclusive from the final intersecting set of final voxels. Each final voxel of the final internal set of final voxels is wholly encapsulated by the final voxels of the final intersecting set of final voxels. The union set determination module further determines a union set of initial voxels from the plurality of initial voxels based on the initial external set of initial voxels and the final internal set of final voxels. An initial voxel of the union set of initial voxels intersects a final voxel of the final internal set of final voxels. The system further comprises an aperture location determination module that determines a location of the aperture by identifying initial voxels of the union set of initial voxels that share at least one face with at least one initial voxel of the initial external set of initial voxels.

Further areas of applicability of the teachings of the present disclosure will become apparent from the detailed description and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The description herein makes reference to the accompanying drawings where the reference numerals refer to like features throughout the several views.

FIGS. 9A-9C are drawings illustrating a cross-sectional view of a bounding box illustrative of iterations for determining a union set of initial voxels;

FIG. 10 is a drawing illustrating a cross-section view of a bounding box illustrative of a located aperture in an object;

DETAILED DESCRIPTION

Figure 1:
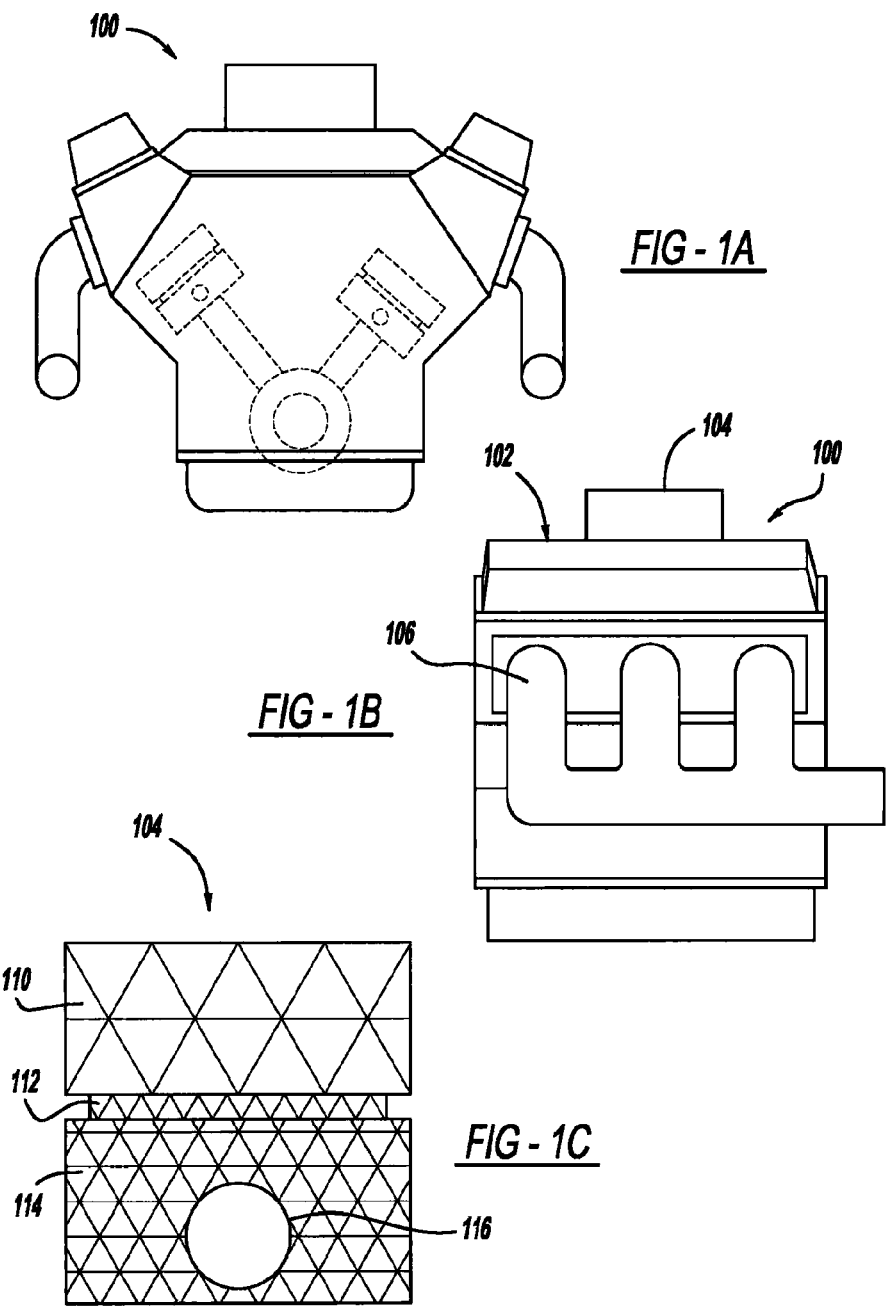
FIG. 1A is a drawing illustrating an exemplary representation of a three-dimensional object.
FIG. 1B is a drawing illustrating an cross-sectional view exemplary representation of a three-dimensional object.
FIG. 1C is a drawing illustrating a component of the three-dimensional object made up of a plurality of triangles.

The present disclosure relates to a system and method for locating an aperture in a three dimensional (3D) representation of an object. Referring to FIG. 1A, an exemplary 3D representation of an object 100 is depicted. The 3D representation 100 can be of any type of object. The 3D representation is a representation of the entire object, including the internal components of the object. For instance, FIG. 1B illustrates a cross-sectional view of the 3D representation 100. As can be seen, the 3D representation 100 includes the internal components 102, 104, and 106 of the object. For purposes of explanation, a representation of an object will hereinafter be referred to as an "object."

A 3D object is generated using a plurality of triangles. Each component 102, 104, or 106 is comprised of thousands or millions of triangles, which form the entire object, including wholly contained portions of the object. FIG. 1C illustrates an exemplary component 102 of the 3D object 100. In the example of FIG. 1C, an aperture 116 is defined in the object 100. The aperture 116 can be any type of opening in the object. For instance, the aperture may be a hole for a small screw or a valve.

As can be seen, the exemplary component 104 is represented by a plurality of triangles, including a first triangle 110, a second triangle, 112, and a third triangle 114. It is appreciated that the triangles may be of different sizes, areas, and angles. A triangle can be represented by three vertices, where each vertex defines a point in a space or a point in relation to the other triangles. Thus, each vertex in a 3D object may include 3 values, i.e., an x-value, a y-value, and a z-value. For example only, a triangle can be represented by the following data structure:

```
Triangle{
    float first_vertex[3];
    float second_vertex[3];
    float third_vertex[3];
}
```

As can be appreciated, each vertex is represented by a floating point decimal to provide an accurate representation of the object. It is appreciated that the triangle does not need to be represented by floating point decimals, and can be represented by other variable types as well. But for purposes of example, an exemplary floating point decimal may be represented by a predetermined amount of bits, e.g., 48 bits. Thus, for each vertex, 144 bits may be used to represent the vertex and 432 bits to represent the triangle. In a complex object, such as a vehicle engine, the complex object may be represented by 10,000,000 or more triangles, which is approximately 4 GB. As mentioned, many analytical computations may require iterative rendering of these complex objects. Thus, the amount of computational resources to perform these computations can become very large.

Figure 2:
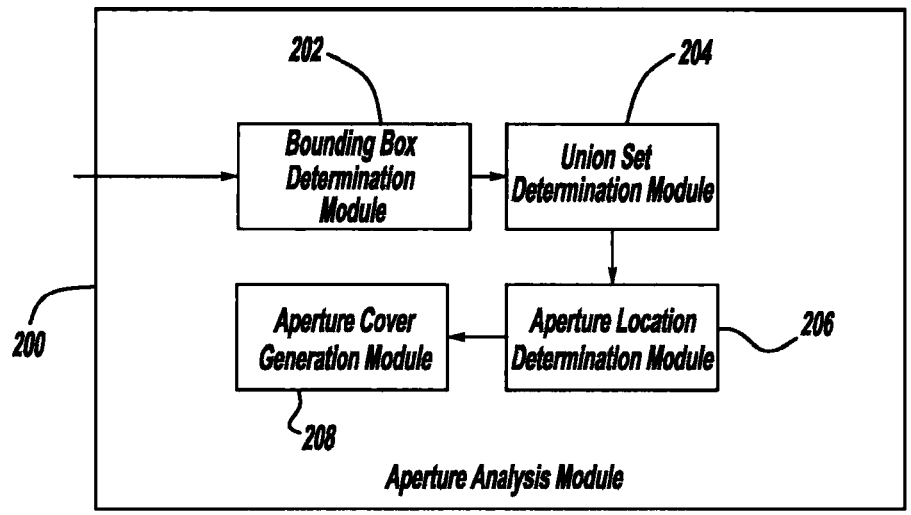
FIG. 2 is a block diagram illustrating exemplary components of aperture analysis module.

FIG. 2 illustrates an exemplary aperture analysis module 200. The exemplary aperture analysis module 200 can include a bounding box determination module 202, a union set determination module 204, an aperture location determination module 206, and an aperture cover generation module 208. An exemplary aperture analysis module 200 is comprised of computer readable instructions that are executed by a processor. The computer readable instructions can be stored in a computer readable medium, such as a hard disc drive, read-only memory, random access memory, optical storage, or any other memory device.

Figure 3:
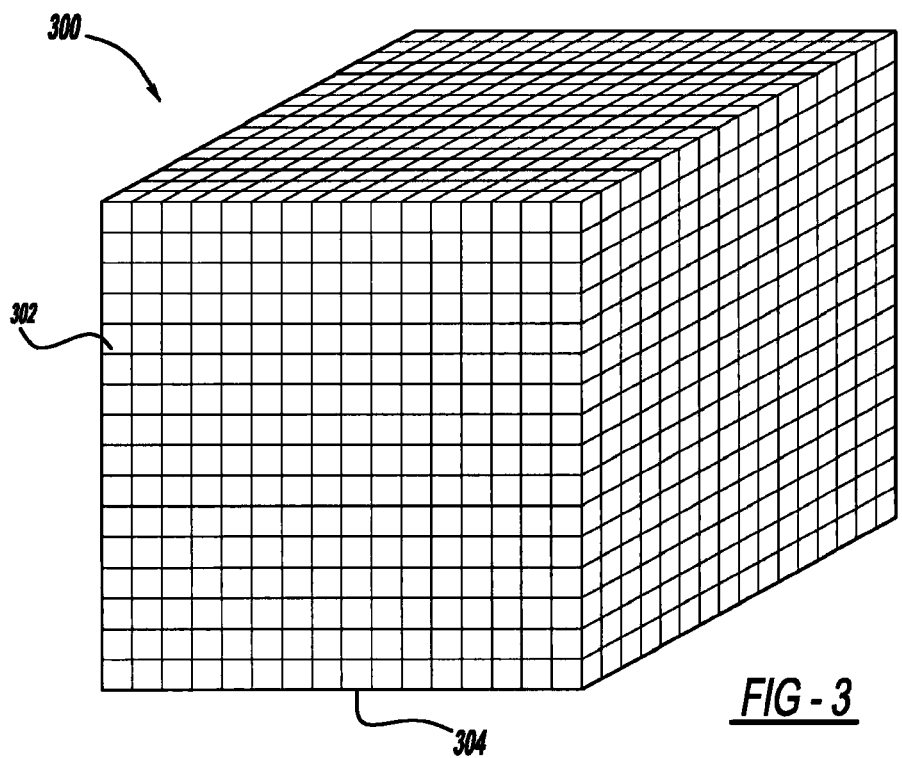
FIG. 3 is a drawing illustrating an exemplary bounding box.

The bounding box determination module 202 receives a 3D object from an object source. The object source may be a user or another application. The bounding box determination module 202 will determine a bounding box that fits around the object 100. FIG. 3 illustrates an exemplary bounding box 300. A bounding box 300 is a 3D space with defined parameters, which contains all the points in the received object 100. It is appreciated that the bounding box can be a cube, a cuboid, a rectangular prism, a hexahedron, a sphere, a pyramid, or any other 3D shape. In some embodiments, a minimum-perimeter bounding box is used.

The bounding box 300 can be divided into or may include a plurality of voxels, e.g. voxel 302 and voxel 304. A voxel is a volumetric pixel, or a 3D pixel. The bounding box 300 has i voxels spanning the width of the bounding box 300, j voxels spanning the height of the bounding box 300, and k voxels spanning the depth of the bounding box 300. Thus, the bounding box 300 is comprised of i×j×k voxels. Each voxel can represent a predetermined amount space. For instance, one voxel may represent a 2 mm×2 mm×2 mm space and have a volume of 8 mm³. It is appreciated that because the voxels can be located at predetermined locations and can be of predetermined size, the voxels can be represented by a single point representing a predetermined location, e.g., the Cartesian coordinate of the top front left corner of the voxel or the center point of the voxel.

In some embodiments, a voxel is represented by a data structure that includes a reference vertex and a state variable indicating a state of the voxel. As will be discussed below, the state variable can be used to identify whether the corresponding voxel is intersected by the 3D object 100, whether the voxel is a non-intersecting voxel external to the object, or whether the voxels is an non-intersecting voxels wholly contained by the object, i.e., internal. Initially, the voxels can be set to have a default value, e.g., 0. The default value indicates that the corresponding voxel has not yet had its corresponding state determined. The voxel may also include an array of pointers that point to the neighboring voxels. Each element in the array would point to the voxel that shares a particular face with the voxel. Thus, the array would include 6 pointers, one pointer for each face of the voxel. An exemplary voxel data structure is provided below:

```
Voxel{
    int start_point[3];      //reference point for the voxel
    voxel * neighbor[6];     //each element points to a neighbor
    char state_value = 0;    //set to default value
}
```

It is appreciated that other data structures may be used in place of the foregoing. For instance, a data structure may not include a neighbor array. Rather, neighbors of a voxel can be referenced by incrementing or decrementing one of the x, y, or z values in start_point. For example, where a voxel has an upper, left, front corner at 4,4,4 and each voxel is 2×2×2 in volume, neighboring voxels can be determined by adding two or subtracting two from one of the x, y, or z values of the voxel. Thus, in this example, the upper neighbor (assuming the z direction is up) would have an upper, left, front corner at 4, 4, 6 and the lower neighbor would have an upper, left, front corner at 4, 4, 2.

When generating the bounding box, the bounding box determination module 202 determines an initial voxel size for the 3D bounding box 300, and generates a plurality of initial voxels that are embedded into the 3D bounding box 300. As will be described in greater detail below, the union set determination module 204 iteratively decreases the resolution of the voxels, i.e., determining a plurality of new voxels by increasing the volume or dimensions of the voxels, until a plurality of final voxels is determined. Once the final plurality of voxels is determined, the union set determination module 204 determines a union set of initial voxels from the plurality of initial voxels. As will be described in greater detail below, at each iteration the union set determination module 204 embeds the 3D object 100 being analyzed into the bounding box 300 and determines an intersecting set of voxels that intersect the plurality of triangles representing the object. At each iteration, the union set determination module 204 further determines an internal set of voxels, such that a member of the internal set of voxels does not intersect the object and is wholly encapsulated by voxels in the intersecting set of voxels. The union set determination module 204 will also determine an external set of voxels, such that a member of the external set of voxels is not a member of the intersecting set of voxels and is not wholly encapsulated by voxels in the intersecting set of voxels. The union set determination module 204 then determines a ratio based on the amount of voxels in the external set of voxels and the amount of voxels in the internal set of voxels. The ratio is compared with a predetermined threshold, e.g., 1. If the ratio is greater than the predetermined threshold, the union set determination module 204 stops iterating. If, however, the ratio is less than the predetermined threshold, then the union set determination module 204 continues to perform further iterations. Once the union set determination module 204 stops iterating, the plurality of voxels at the last iteration is identified as the plurality of final voxels, and the external, intersecting, and internal voxels are identified as the final external, final intersecting, and final internal sets of final voxels, respectively.

Once the union set determination module 204 has determined the final external, final intersecting, and final internal sets of final voxels, the union set determination module 204 embeds the plurality of initial voxels into the bounding box 300 with the plurality of final voxels to determine a union set of voxels from the initial plurality of initial voxels. The union set of initial voxels is defined as any initial voxel from the external set of initial voxels that intersects with a final voxel from the final internal set of final voxels. An initial voxel is said to intersect a final voxel if the initial voxel contains at least one point in the final voxel. As can be appreciated, the final voxels are larger than the initial voxels, so it may be the case that the one or more initial voxels are contained within a final voxel. It is noted that initial voxels that were included in the union set of initial voxels can be identified as no longer being included in the initial external set of initial voxels. As will be described in greater detail below, this can be achieved, for example, by changing the state value of the initial voxel.

Once the union set of initial voxels is determined by the union set determination module 204, the aperture location determination module 206 can determine the location of an aperture. The aperture location determination module 206 identifies the location of an aperture by identifying initial voxels from the union set of initial voxels that border initial voxels from the initial external set of initial voxels. The aperture location determination module 206 labels the initial voxels from the union set of initial voxels as being the location of the aperture. As will be described in greater detail below, this can be achieved, for example, by changing the state value of the initial voxel.

The aperture cover generation module 208 receives the locations of the located apertures and generates a cover for the holes. The aperture cover generation module 208 identifies a face of an initial voxel in the union set of voxels that is common to an initial voxel from the initial external set of initial voxels. The aperture cover generation module 208 uses the common face to generate at least two triangles corresponding to the common face. The at least two triangles are added to the plurality of 2D triangles. The aperture cover generation module 208 can perform this technique to all common faces, i.e., initial voxel faces that are common to initial voxels in the union set of initial voxels and initial voxel in the initial intersection set of initial voxels, thereby generating covers for all the identified apertures.

Figure 4:
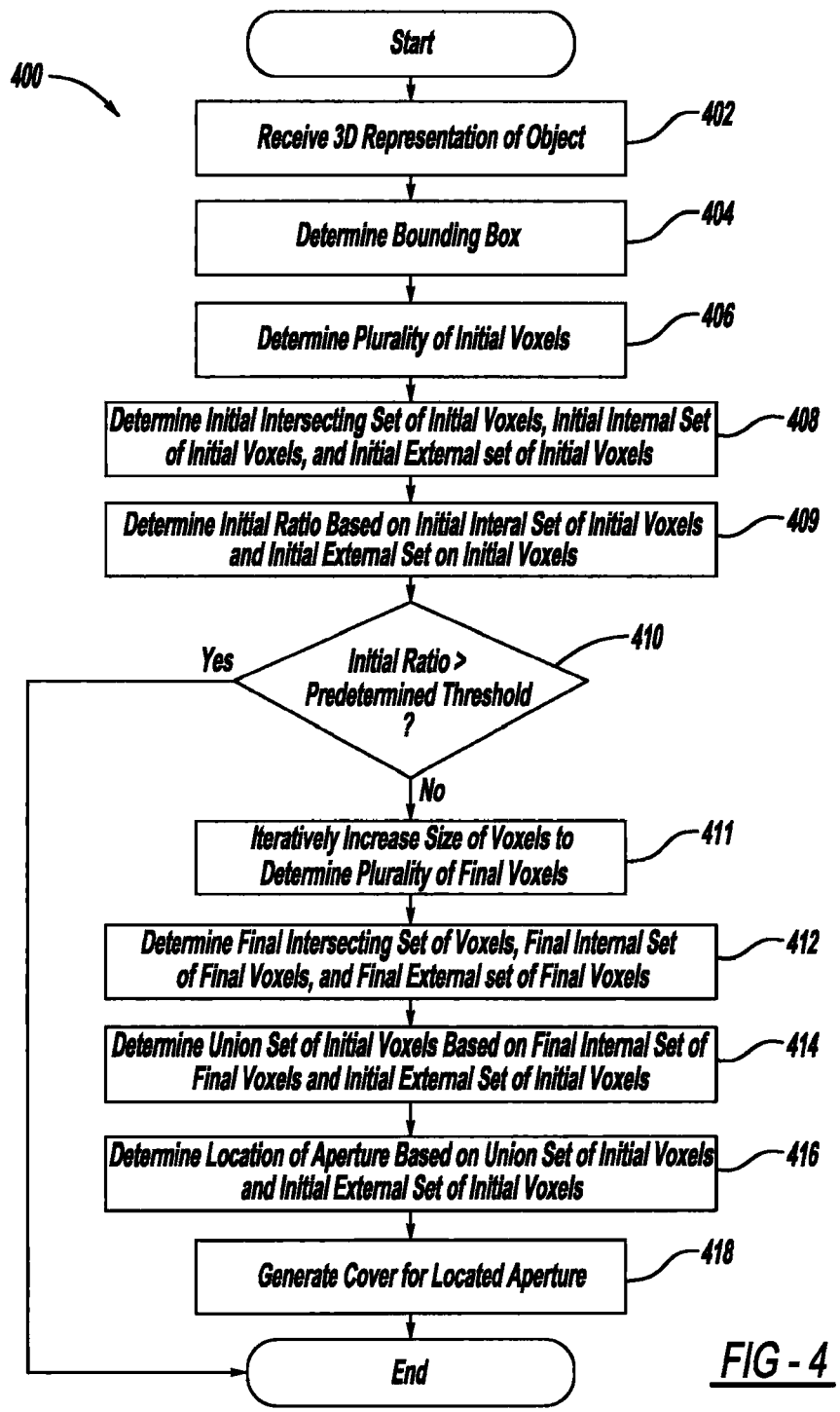
FIG. 4 is a flow chart illustrating an exemplary method for locating an aperture in a representation of an object and generating a cover for the aperture.

Referring now to FIG. 4, an exemplary method 400 for generating covers for apertures in a 3D object is described. As was discussed above, the bounding box determination module 202 receives a 3D object 100, as shown at step 402. At step 404, the bounding box determination module 202 determines a bounding box having sufficient dimensions to encapsulate the object 100. In some embodiments, the bounding box determination module 202 will determine the minimum and maximum x-values, y-values, and z-values in the entire set of triangles. For example, the bounding box determination module 202 can sort the x-components of each vertex of each triangle, the y-components of each vertex of each triangle, and the z-components of each vertex of each triangle. The maximum value and the minimum value of each set of components would define the maximum and minimum x, y, and z values of the bounding box. Further, in some embodiments, the bounding box determination module 202 can add an extra layer of voxels around the bounding box, such that the representation of the object does not intersect any of the voxels located at the outer perimeter of the bounding box.

Figure 5A:
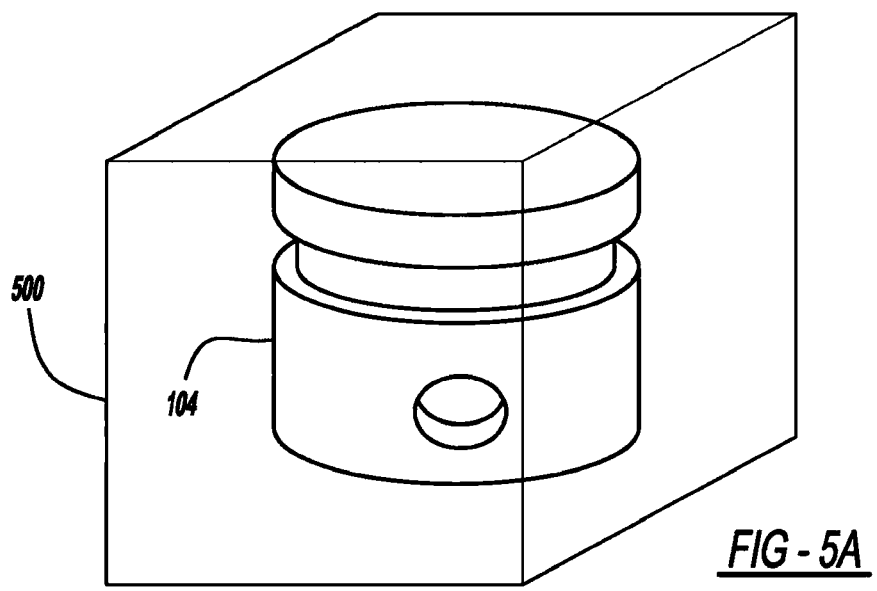
FIG. 5A is a drawing illustrating a bounding box with an object embedded therein.

The bounding box determination module 202 may be further configured to embed the object into the bounding box. FIG. 5A illustrates an object 104 (FIG. 1C) contained within a bounding box 500. The bounding box determination module 202 can embed the 3D object 104 into the bounding box 500 in any suitable fashion. For example, it is appreciated that embedding the object 104 may be performed by ensuring that the vertices of the triangles are in the same space as the bounding box 500, e.g. both the bounding box 500 and the object 104 are in the same Cartesian space and the vertices of the triangles are all within the domain of the bounding box 500.

Figure 5B:
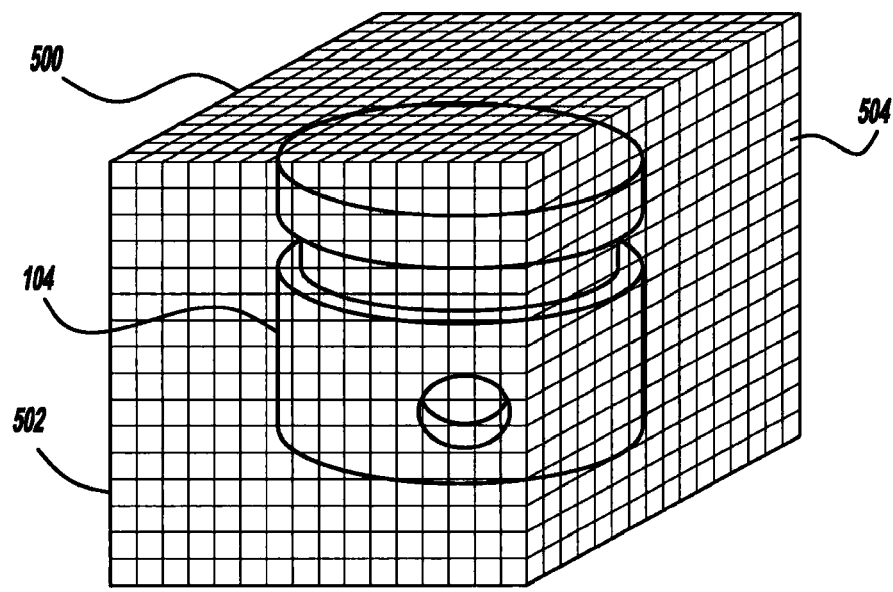
FIG. 5B is a drawing illustrating a bounding box with an object embedded therein and in relation to a plurality of voxels.

The bounding box determination module 202 is further configured to determine a plurality of initial voxels for the bounding box 500, as shown at step 406. The dimensions of the initial voxels may be set to a first predetermined value, e.g., 2 mm×2 mm×2 mm. The plurality of initial voxels is embedded in the bounding box 500. FIG. 5B illustrates the bounding box 500 having a plurality of initial voxels embedded therein, e.g., voxel 502 and voxel 504. As can be observed from FIG. 5B, the object 104 is also embedded therein.

Once the bounding box determination module 202 has determined a bounding box 500 sufficient to encapsulate the object 104 and a plurality of initial voxels corresponding to the bounding box 500, the union set determination module 204 determines an initial intersecting set of initial voxels, and initial internal set of initial voxels, and an initial external set of initial voxels, as shown at step 408.

To determine the initial intersecting set of initial voxels, the union set determination module 204 determines the initial voxels that intersect with at least one point of one triangle from the triangles representing the object 104. If an initial voxel intersects with at least one point of one triangle, then the initial voxel is included in the initial intersecting set of initial voxels. Copending U.S. Patent Application 61/584,408, filed on Jan. 9, 2012, which is herein incorporated by reference, describes the process of determining an intersecting set of voxels in greater detail. Once the intersecting set of voxels is determined, it is appreciated that the union set determination module 204 can adjust the state value of an intersecting voxel to a predetermined value, e.g., 2, indicating that the voxel is in the intersecting set of voxels. Thus, once the union set determination module 204 determines the initial intersecting set of initial voxels, an initial voxel may have one of two state values. For example, a first state value of 0 indicates that a voxel is not in the initial intersecting set of initial voxels, and a second state value of 2 indicates that a voxel is in the initial intersecting set of initial voxels.

Figure 6:
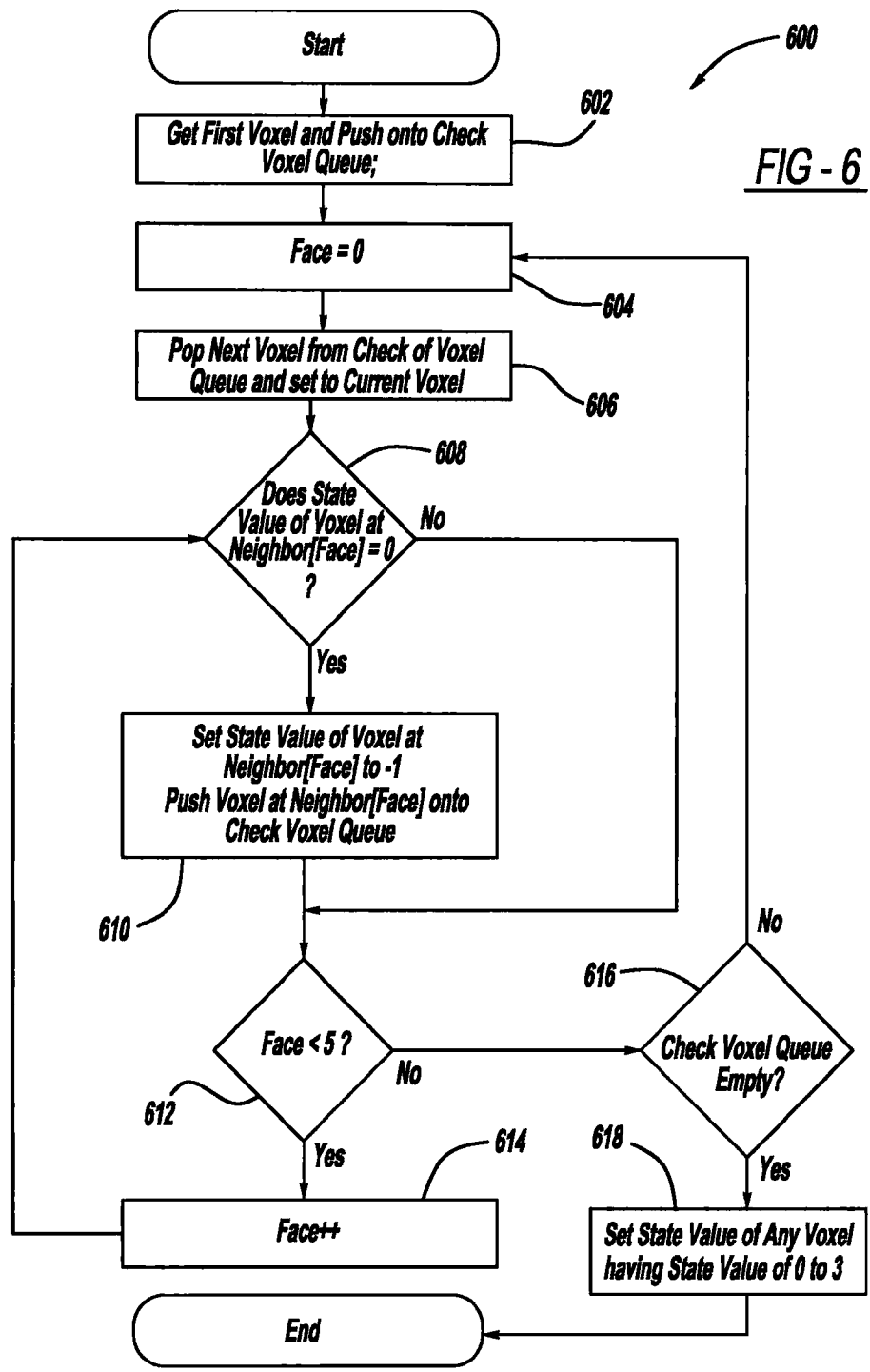
FIG. 6 is a flow chart illustrating an exemplary method for determining an external set of voxels and an internal set of voxels.

Upon determining the initial intersecting set of initial voxels, the union set determination module 204 will determine an initial external set of initial voxels and an initial internal set of initial voxels. The initial external set of initial voxels and the initial internal set of initial voxels can be determined using a filling algorithm. FIG. 6 illustrates an exemplary method 600 for performing a filling algorithm. As will be described in greater detail below, the filling algorithm is performed at multiple iterations, so the initial voxels are described generically and not as initial voxels.

The following method 600 uses the definition of the voxel data structure described above, including the neighbor array that references the neighbors of a particular voxel at each face of the particular voxel. It is appreciated that the method 600 can be altered to use a different data structure, and the method described above is provided for example only. Initially, the union set determination module 204 obtains a first voxel having a state variable value equal to the default value, e.g., 0. The first voxel is pushed onto a check voxel queue, as shown at step 602 and its state value is changed to −1. It is appreciated that the queue can be a FIFO queue or a LIFO queue (i.e., a stack), or any other means for keeping track of which voxels need to be checked. The voxels queued in the check queue are voxels determined to be not in the intersecting set of voxels, i.e., voxels having a state variable value equal to 0.

The union set determination module 204 will iteratively check the state values of each voxel neighboring each face of a current voxel. Thus, a variable, e.g., a variable referenced as "face," is initially set to 0, as shown at step 604. The face variable is a counter that indicates a face of the current voxel that is to be analyzed in the coming iteration. Thus, the union set determination module 204 will check up to six faces, e.g., faces 0 to 5, of a current voxel.

At step 606, the union set determination module 204 dequeues a voxel from the check voxel queue. The dequeued voxel is the current voxel, i.e., the voxel to be analyzed.

The union set determination module 204 checks the state values of the voxels neighboring the current voxel, as shown at step 608. To do so, the union set determination module 204 will read the state value of the voxel pointed to by neighbor [face]. If the state value of the voxel pointed to by neighboring array[face] is equal to 0, the neighboring voxel is inserted into the check voxel queue, as shown at step 610. Further, the state value of the neighboring value can be set to a value indicating that the voxel has been analyzed once and has been inserted into the check voxel queue. For example, the state value of the neighboring voxel may be set to a third value, e.g., −1. By changing the state value to the third value, the voxel has been identified as having been checked by the union set determination module 204 and as not being a member of an intersecting set of voxels. It is appreciated that voxels having a state value equal to the third value are in the external set of voxels.

If the state variable value of the voxel pointed to by neighbor[face] is not equal to 0, the union set determination module 204 ignores the voxel pointed to by neighbor[face].

Once the neighboring voxel referenced by neighbor[face] of the current voxel has been analyzed, the union set determination module 204 will determine whether all the faces of the current voxel have been analyzed, as shown at step 610. If not all of the neighboring voxels of the current voxel have been analyzed, the face variable is incremented, as shown at step 612, and the union set determination module 204 analyzes a next neighboring voxel of the current voxel, as shown at step 608. If, however, all of the faces of the current voxel have been analyzed, then the union set determination module 204 checks the contents of the check voxel queue to determine if there are more voxels to analyze, as shown at step 616. If the check voxel queue is not empty, the union set determination module 204 resets the face variable to 0 and dequeues the next voxel in the check voxel queue, as shown at steps 604 and 606. If no more voxels remain in the check voxel queue, the union set determination module 204 assumes that all of the external voxels have been checked. The union set determination module 204 will then find any voxel in the plurality of voxels having a state value of 0 and will change the state value thereof to a 3, thereby indicating that the voxel is a member of the internal set of voxels. Thus, when the method 600 has completed, the state value of a voxel in the bounding box 500 will be either −1, 2, or 3. A state value of −1 indicates that the voxel is in the external set of voxels, a state value of 2 indicates that a voxel is in the intersecting set of voxels, and a state value of 3 indicates that a voxel is in the internal set of voxels. It is appreciated that the following assumption holds true if the bounding box 500 includes an outermost layer of voxels that are all non-intersecting voxels. It is appreciated that the method 600 may be altered to ensure that all non-intersecting voxels are analyzed. Furthermore, it is appreciated that the state values provided in this foregoing example are arbitrary values and any type of values or flags may be used to indicate the state of a voxel.

It is appreciated that the foregoing method is provided for example only. Alternative methods for determining an intersection set of voxels, an external set of voxels, and an internal set of voxels may be used. Further, the steps of the method can be altered, and some steps described above can be performed in multiple steps.

Referring back to the method 400 of FIG. 4, once the union set determination module 204 has determined the initial intersecting set of initial voxels, the initial external set of initial voxels, and the internal set of initial voxels, the union set determination module 204 will determine whether there is an aperture in the object. In some embodiments, the union set determination module 204 will calculate an initial ratio of the amount of initial voxels in the initial internal set of initial voxels to the amount of initial voxels in the initial external set of initial voxels, as shown at step 409. The initial ratio is compared to a predetermined threshold, e.g., 1, as shown at step 410. If the initial ratio is greater than the predetermined threshold, the union set determination module 204 infers that there is no further analysis required and the method stops executing. If, however, the initial ratio is less than the predetermined threshold, then the union set determination module will perform an iterative method to determine a plurality of final voxels, as shown at step 411.

The plurality of final voxels is determined by iteratively increasing the size of the voxels in the bounding box 500, and determining incrementally intersecting sets of voxels, the external sets of voxels, and internal sets of voxels at the increasing voxel sizes, until the amount of voxels in the internal set of voxels increases with respect to the amount of voxels in the external set of voxels. Once such an increase is observed, the plurality of voxels corresponding to the current iteration are identified as the plurality of final voxels, and the intersecting, internal, and external sets of voxels are identified as the final intersecting, final internal, and final external sets of final voxels, respectively, as shown at step 412.

Figure 7:
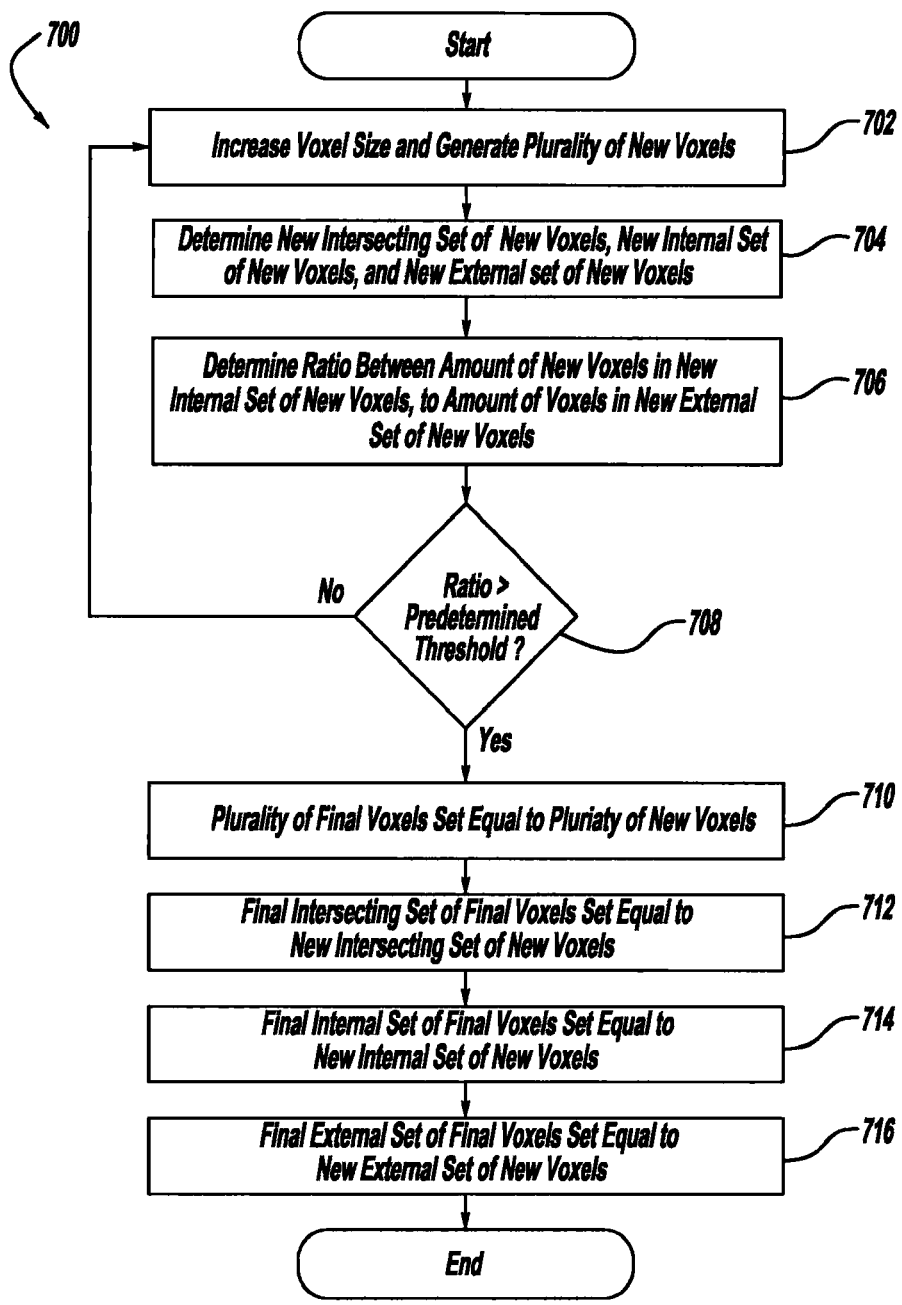
FIG. 7 is a flow chart illustrating an exemplary method for determining a final plurality of voxels.

FIG. 7 illustrates an exemplary method 700 for determining the plurality of final voxels, as well as the final intersecting, final internal, and final external sets of final voxels. At the onset of the method 700, it is assumed that the plurality of initial voxels, as well as the initial intersecting, initial external, and the initial internal plurality of voxels have already been determined. Thus, at step 702, a plurality of new voxels is generated by increasing the voxel size. As discussed above, the size of the voxels of the plurality of initial voxels is set to a predetermined voxel size, e.g., 2 mm×2 mm×2 mm. The union set determination module 204 increases the size of the voxels to a new size. For example, the union set determination module 204 can double the dimensions of a voxel, e.g., the voxels of a new voxel can be set to 4 mm×4 mm×4 mm.

The plurality of new voxels are embedded into the bounding box 500, as well as the representation of the object 104, and a new intersecting set of new voxels, a new external set of new voxels, and a new internal set of new voxels can be determined in the manner described above. Namely, the union set determination module 204 determines a set of new voxels that intersect with the plurality of triangles representing the object 104, and then performs the filling algorithm described above, as shown at 704. Once the new internal set of new voxels and the new external set of new voxels are determined, the union set determination module 204 calculates a ratio representing an amount of voxels in the new internal set of new voxels to the amount of voxels in the new external set of new voxels, as shown at 706. The ratio corresponding to the current iteration is compared to a predetermined threshold, e.g., 1, as shown at step 708.

Figure 8:
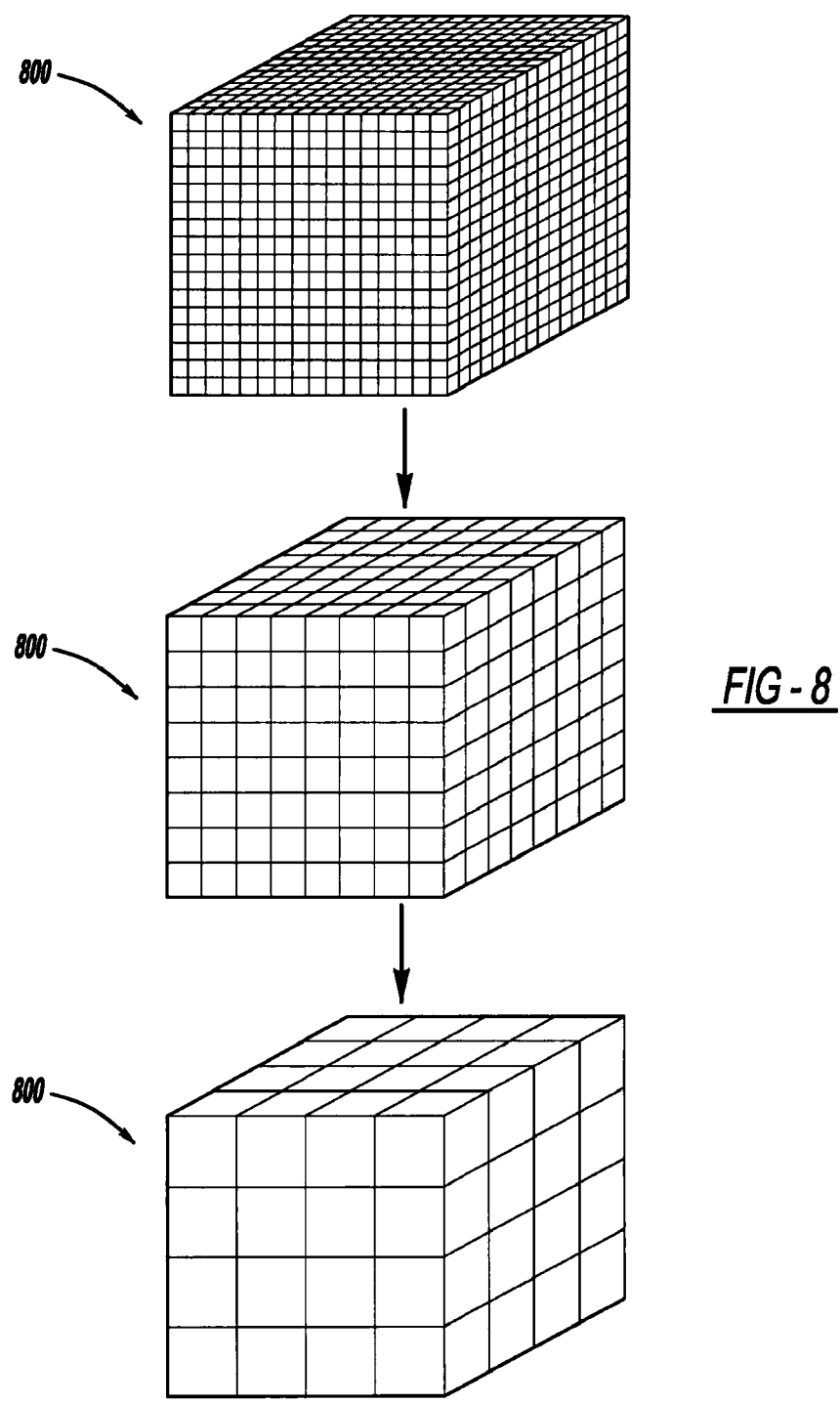
FIG. 8 is a drawing illustrating a bounding box shown having voxels of decreasing resolution.

If the calculated ratio is not greater than the predetermined threshold, then the method 700 steps back to step 702 and increases the voxel size. FIG. 8 illustrates an example of voxel sizes being iteratively increased. At a first iteration, the bounding box 800 includes a plurality of first voxels of a first size. After the first iteration, assuming the calculated ratio did not exceed the predetermined threshold, the voxel size is increased. Thus, during the second iteration the bounding box 800 includes a plurality of second voxels of a second size. After the second iteration, again assuming that a newly calculated ratio did not exceed the predetermined threshold, the voxel size is increased. During the third iteration, the bounding box 800 includes a plurality of third voxels of a third size. It is appreciated that the union set determination module 204 will continue to iteratively increase the voxel size until the calculated ratio exceeds the predetermined threshold. In the example of FIG. 8, the voxel dimensions are doubled at each iteration. It is appreciated, however, that the increase in the dimensions of the voxels can be performed in any suitable manner.

Once the union set determination module 204 determines that the ratio corresponding to the current iteration is greater than the predetermined threshold, the union set determination module 204 identifies the plurality of new voxels corresponding to the current iteration as the plurality of final voxels, as shown at step 710. As will be described below, the plurality of final voxels is used by the union set determination module 204 to determine a union set of initial voxels. The union set determination module 204 further identifies the intersecting set of new voxels corresponding to the current iteration as the final set of final voxels, as shown at step 712. The union set determination module 204 further identifies the internal set of new voxels corresponding to the current iteration as the final internal set of final voxels, as shown at step 714. The union set determination module 204 further identifies the external set of new voxels corresponding to the current iteration as the final external set of final voxels, as shown at step 716.

It is appreciated that the foregoing method 700 is exemplary and other methods for determining the plurality of final voxels and the final intersecting set, the final external set, and the final internal set can be implemented by the union set determination module 204 and are within the scope of the disclosure. Furthermore, variations of the method 700 are contemplated and within the scope of this disclosure.

Referring back to FIG. 4, once the union set determination module 204 has identified the final internal set of final voxels, the union set determination module 204 determines the union set of initial voxels based on the final internal set of final voxels and the initial intersecting set of initial voxels, as shown at step 414. The union set determination module 204 embeds the plurality of initial voxels and the plurality of final voxels in the bounding box 800 and determines an intersection between members of the initial external set of initial voxels and the final internal set of final voxels. The result of the intersection between the initial external set of initial voxels and the final internal set of final voxels is the union set of initial voxels. In some embodiments, the union set determination module 204 will adjust the state value of initial voxels in the union set to a predetermined value, e.g., 4, to indicate that the initial voxel is in the union set.

Figure 9A:
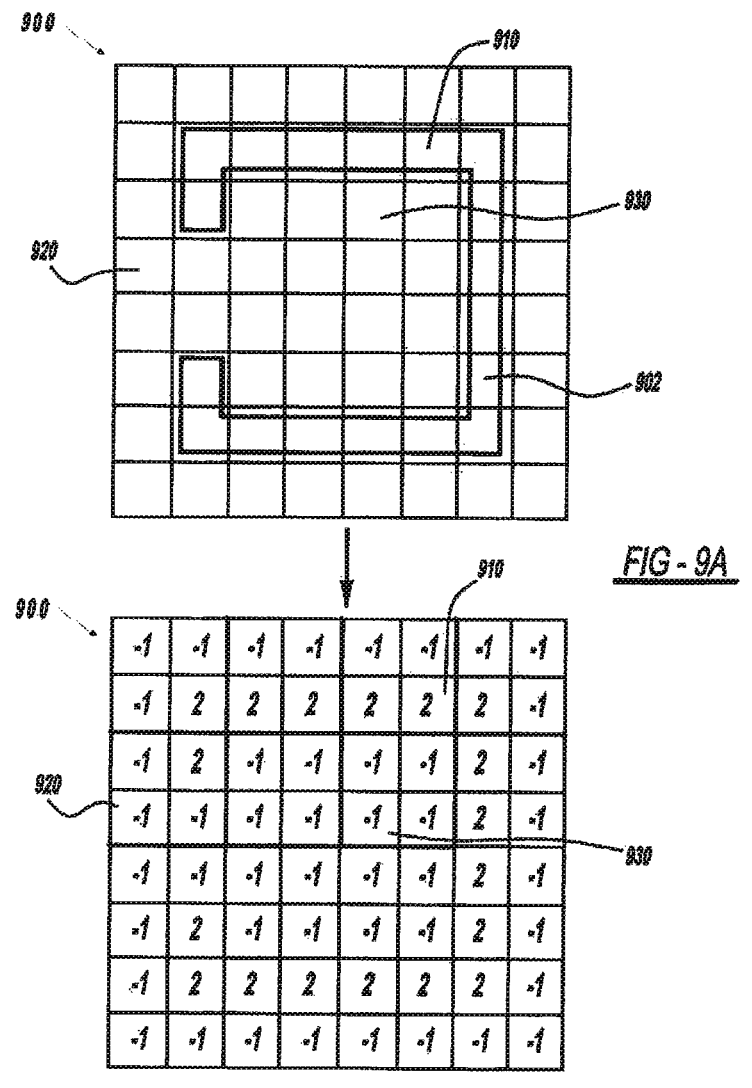
Figure 9B:
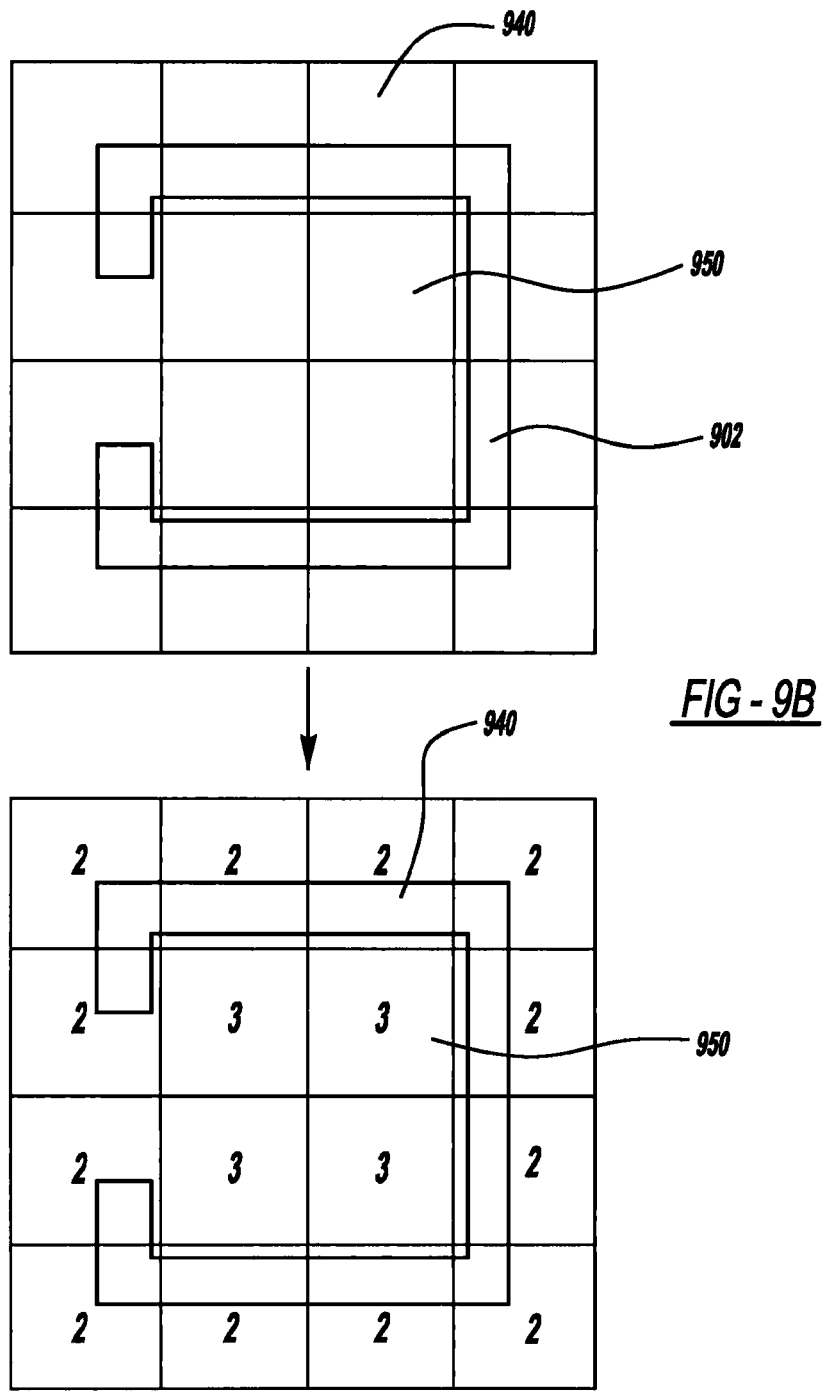
Figures 9C, 10:
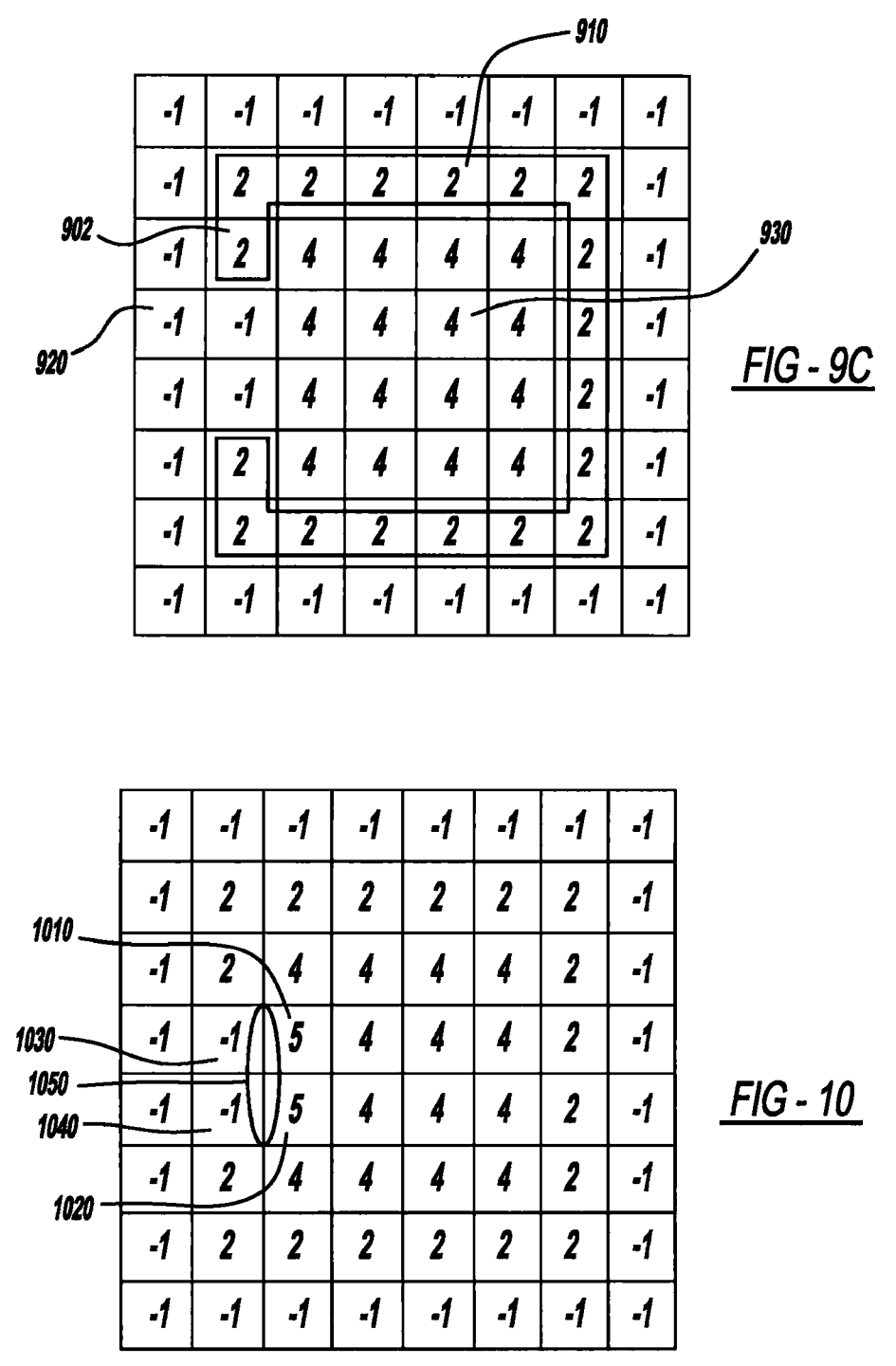

FIGS. 9A-9C illustrate an example of determining a union set of initial voxels. FIG. 9A is a cross-sectional view of a bounding box 900 having an object 902 embedded therein with respect to a plurality of initial voxels, e.g., voxels 910, 920 and 930. In the example, the initial intersecting set of initial voxels is represented by voxels having a state value of 2, e.g., voxel 910, and the initial external set of initial voxels is represented by voxels having a state value of −1, e.g., voxel 920. As can be appreciated, the initial set of internal voxels is an empty set, as the aperture in object 902 resulted in the filling algorithm identifying voxels within the object, e.g., voxel 930, as being in the initial external set of initial voxels.

FIG. 9B is a cross-sectional view of the bounding box 900 having the object 902 embedded therein with respect to a plurality of final voxels, e.g., voxels 940 and 950. In the example, the final intersecting set of final voxels is represented by voxels having a state value of 2, e.g., voxel 940, and the final internal set of final voxels is represented by voxels having a state value of 3 e.g., voxel 950. As can be appreciated from FIG. 9B, voxel 950 is wholly encapsulated by final voxels in the final intersecting set of final voxels. Thus, the union set determination module 204 adjusts the state value of voxel 950 to 3, thereby including voxel 950 in the final internal set of final voxels.

FIG. 9C is a cross-sectional view of the bounding box 900 having the object 902 embedded therein with respect to a plurality of initial voxels, e.g., voxels 910, 920, and 930. In the example, the union set determination module 204 has determined the intersection of the initial external set of initial voxels from FIG. 9A and the final external set of final voxels of FIG. 9B. The union set determination module 204 adjusts the state values of voxels in the union set of initial voxels to a predetermined value indicating that the initial voxel is in the union set, e.g., 4. As can be appreciated from FIG. 9C, voxel 930 intersected with voxel 950 from FIG. 9B. Thus, voxel 930 is included in the union set of initial voxels.

Referring back to FIG. 4, once a union set of initial voxels has been determined, the aperture location determination module 206 determines the location of an aperture based on the union set of initial voxels and the initial external set of initial voxels, as shown at step 416. The aperture location determination module 206 identifies initial voxels in the union set that share at least one face with an initial voxel in the initial external set of initial voxels. In some embodiments, the aperture location determination module 206 will adjust the state value of an initial voxel in the union set found to share at least one face with one or more initial voxels in the initial external set of initial voxels. For example, the state value may be adjusted to 5.

FIG. 10 illustrates an example of a located aperture. FIG. 10 is a cross-sectional view of the bounding box 900 having the object 902 embedded therein, with respect to a plurality of initial voxels, e.g., voxels 1010, 1020, 1030, and 1040. FIG. 10 corresponds to the example provided in FIG. 9A-9C. In the example, voxels 1010 and 1020 are in the union set of initial voxels and share a face with voxels 1030 and 1040, which are in the external set of initial voxels. As can be appreciated from the oval 1050, the face between voxels 1010 and 1030, and between voxels 1020 and 1040 have been identified as the location of the aperture.

Figure 11:
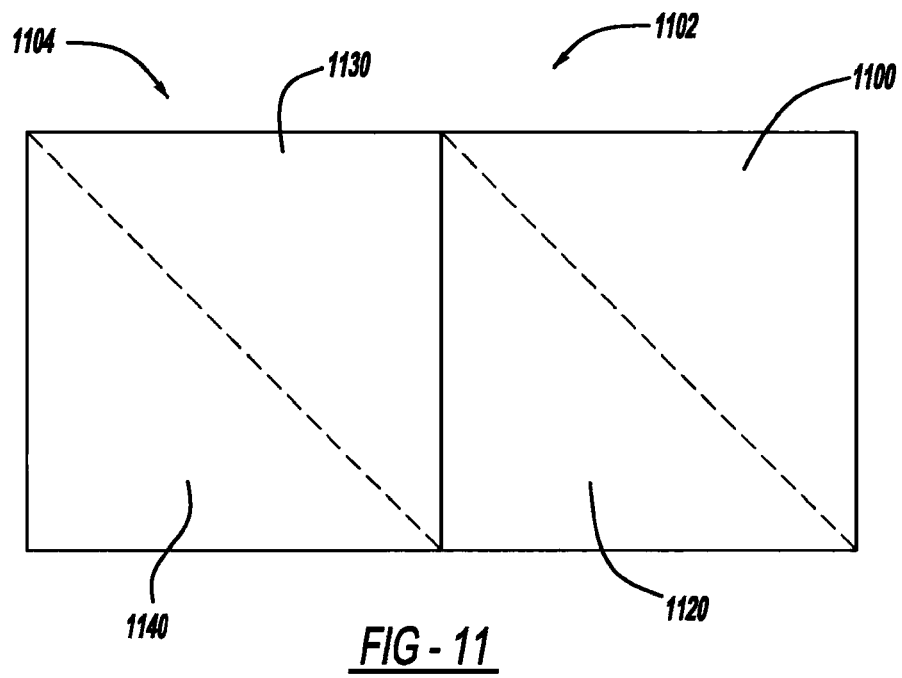
FIG. 11 is a drawing illustrating two faces of two voxels being divided into a plurality of triangles.
Figure 12:
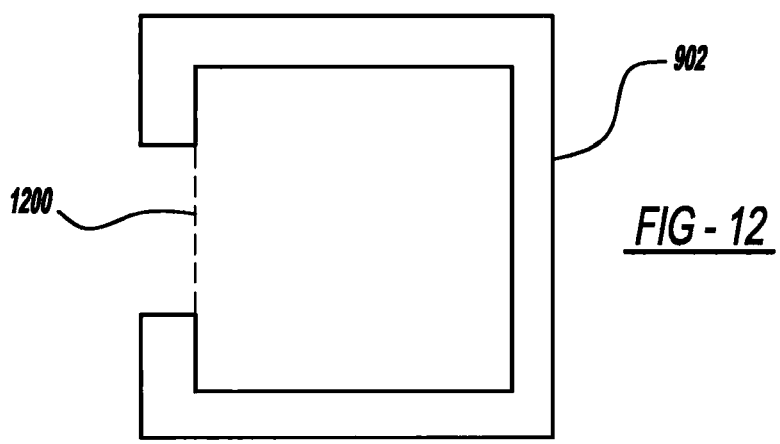
FIG. 12 is a drawing illustrating a cross-sectional view of an object with a cover for an aperture of the object.

Referring back to FIG. 4, once a location of an aperture has been identified, the aperture cover generation module 208 generates a cover for the located aperture, as shown at step 418. In some embodiments, the aperture cover generation module 208 generates two triangles for each face that is common to an initial voxel in the union set of initial voxels and an initial voxel in the initial external set of initial voxels. The generated triangles are included into the plurality of triangles representing the object. For example, in the example of FIG. 10, the face shared between voxel 1010 and 1030 can be divided into two triangles. Similarly, the face shared between voxel 1020 and 1040 can be divided into two triangles. FIG. 11 illustrates an example of triangles resulting from bisecting the shared faces. In this example, two squares represent two shared faces, e.g., face 1102 and face 1104, between two sets of bordering voxels. In the example, the aperture cover generation module 208 has generated four triangles 1110, 1120, 1130, and 1140 from the two faces 1102 and 1104 of the bordering voxels. The four triangles 1110, 1120, 1130, and 1140 can be included in the plurality of triangles representing the object, such that when the triangles are rendered, the located apertures have been covered. FIG. 12 illustrates an example of the object 902 from FIGS. 9A-C and 10, with a generated cover 1200. As can be appreciated from FIG. 12, the aperture that was previously identified has been sealed.

It is appreciated that after the apertures of an object have been sealed, the plurality of triangles can be returned to an application using the representation of the object. This can be any suitable application. For instance, the system identified in the copending U.S. Patent Application 61/584,408 filed on Jan. 9, 2012 can use the sealed object to generate an outer layer of the sealed object.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A method for identifying an aperture in a three-dimensional (3D) representation of an object, the method comprising:
   receiving a plurality of two-dimensional (2D) triangles representing the object;
   determining a 3D bounding box having dimensions sufficient to encapsulate the object, the 3D bounding box including a plurality of initial voxels for the 3D bounding box, wherein initial voxels of the plurality each have equal initial dimensions;
   determining an intersecting set of initial voxels from the plurality of initial voxels, wherein each initial voxel of the intersecting set of initial voxels intersects with at least one of the plurality of 2D triangles;
   determining an external set of initial voxels from the plurality of initial voxels, the external set of initial voxels being exclusive from the intersecting set of initial voxels and not wholly encapsulated by voxels from the intersecting set of initial voxels;
   determining a plurality of final voxels corresponding to the bounding box, wherein each of the plurality of final voxels have equal final dimensions;
   determining an intersecting set of final voxels from the plurality of final voxels, wherein each final voxel of the intersecting set of final voxels intersects with at least one of the plurality of 2D triangles;
   determining an internal set of final voxels from the plurality of final voxels, the internal set of final voxels being exclusive from the final intersecting set of final voxels and wherein each final voxel of the internal set of final voxels is wholly encapsulated by the final voxels of the intersecting set of final voxels;
   determining a union set of initial voxels from the plurality of initial voxels based on the external set of initial voxels and the internal set of final voxels, wherein an initial voxel of the union set of initial voxels intersects a final voxel of the internal set of final voxels; and
   determining a location of the aperture by identifying initial voxels of the union set of initial voxels that share at least one face with at least one initial voxel of the external set of initial voxels.

2. The method of claim 1 further comprising generating a cover sufficient to seal the aperture based on the location of the aperture and the identified initial voxels in the union set of initial voxels that share at least one face with at least one initial voxel in the external set of initial voxels.

3. The method of claim 2 wherein the cover is generated by generating at least two triangles based on a face that is shared by an identified initial voxel of the union set of initial voxels and an initial voxel of the external set of initial voxels and including the at least two triangles in the plurality of triangles.

4. The method of claim 1 further comprising determining an internal set of initial voxels from the plurality of initial voxels, the internal set of initial voxels being exclusive from the intersecting set of initial voxels and wherein each initial voxel of the internal set of initial voxels is wholly encapsulated by the initial voxels in the intersecting set of initial voxels.

5. The method of claim 4 wherein the external set of initial voxels, the internal set of initial voxels, and the intersecting set of initial voxels are mutually exclusive.

6. The method of claim 1 further comprising determining an external set of final voxels from the plurality of final voxels, the external set of final voxels being exclusive from the intersecting set of final voxels and the internal set of final voxels.

7. The method of claim 6 wherein the plurality of final voxels is determined by iteratively performing the following steps:
   i) determining a plurality of new voxels wherein each of the plurality of new voxels have equal new dimensions, wherein the new dimensions are greater than previous dimensions;
   ii) determining a new external set of new voxels and a new internal set of new voxels;
   iii) determining a first value corresponding to a first amount of new voxels in the new external set of new voxels;
   iv) determining a second value corresponding to a second amount of new voxels in the new internal set of new voxels;
   v) determining a ratio based on the first value and the second value; and
   vi) comparing the ratio with a predetermined threshold;
      wherein the steps i) through vi) are iteratively performed until the ratio exceeds the predetermined threshold.

8. The method of claim 7 wherein the ratio is determined by dividing the second value by the first value.

9. The method of claim 7 wherein the final plurality of final voxels, the internal set of final voxels and the external set of final voxels are equal to the new plurality of new voxels, the new internal set of new voxels and the new external set of new voxels, respectively, after a final iteration is performed.

10. A system for identifying an aperture in a three-dimensional (3D) representation of an object, the system comprising:
   a bounding box determination module that receives a plurality of two-dimensional (2D) triangles representing the object, and that determines a 3D bounding box having dimensions sufficient to encapsulate the object, the 3D bounding box including a plurality of initial voxels, wherein initial voxels of the plurality each have equal initial dimensions;
   a union set determination module that:
   i) determines an intersecting set of initial voxels from the plurality of initial voxels, wherein each initial voxel of the intersecting set of initial voxels intersects with at least one of the plurality of 2D triangles,
   ii) determines an external set of initial voxels from the plurality of initial voxels, the external set of initial voxels being exclusive from the intersecting set of initial voxels and not wholly encapsulated by voxels from the intersecting set of initial voxels,
   iii) determines a plurality of final voxels corresponding to the 3D bounding box, wherein final voxels of the plurality of final voxels each have equal final dimensions,
   iv) determines an intersecting set of final voxels from the plurality of final voxels, wherein each final voxel of the intersecting set of final voxels intersects with at least one of the plurality of 2D triangles,
   v) determines an internal set of final voxels from the plurality of final voxels, the internal set of final voxels being exclusive from the intersecting set of final voxels and wherein each final voxel of the internal set of final voxels is wholly encapsulated by the final voxels of the intersecting set of final voxels, and
   vi) determines a union set of initial voxels from the plurality of initial voxels based on the external set of initial voxels and the internal set of final voxels, wherein an initial voxel of the union set of initial voxels intersects a final voxel of the internal set of final voxels; and
   an aperture location determination module that determines a location of the aperture by identifying initial voxels of the union set of initial voxels that share at least one face with at least one initial voxel of the external set of initial voxels.

11. The system of claim 10 further comprising an aperture cover generation module that generates a cover sufficient to seal the aperture based on the location of the aperture and the identified initial voxels of the union set of initial voxels that share at least one face with at least one initial voxel of the external set of initial voxels.

12. The system of claim 11 wherein the aperture cover generation module generates the cover by generating at least two triangles based on a face that is shared by an identified initial voxel of the union set of initial voxels and an initial voxel of the external set of initial voxels and including the at least two triangles in the plurality of triangles.

13. The system of claim 10 wherein the union set determination module further determines an internal set of initial voxels from the plurality of initial voxels, the internal set of initial voxels being exclusive from the intersecting set of initial voxels and wherein each initial voxel of the internal set of initial voxels is wholly encapsulated by the initial voxels in the intersecting set of initial voxels.

14. The system of claim 13 wherein the external set of initial voxels, the internal set of initial voxels, and the intersecting set of initial voxels are mutually exclusive.

15. The system of claim 10 further comprising determining an external set of final voxels from the plurality of final voxels, the external set of final voxels being exclusive from the intersecting set of final voxels and the internal set of final voxels.

16. The system of claim 15 wherein the union set determination module determines the plurality of final voxels by iteratively performing the following steps:
i) determining a plurality of new voxels wherein each of the plurality of new voxels have equal new dimensions, wherein the new dimensions are greater than previous dimensions;
ii) determining a new external set of new voxels and a new internal set of new voxels;
iii) determining a first value corresponding to a first amount of new voxels in the new external set of new voxels;
iv) determining a second value corresponding to a second amount of new voxels in the new internal set of new voxels;
v) determining a ratio based on the first value and the second value; and
vi) comparing the ratio with a predetermined threshold; wherein the steps i) through vi) are iteratively performed until the ratio exceeds the predetermined threshold.

17. The system of claim 16 wherein the ratio is determined by dividing the second value by the first value.

18. The system of claim 16 wherein the plurality of final voxels, the internal set of final voxels and the external set of final voxels are equal to the new plurality of new voxels, the new internal set of new voxels and the new external set of new voxels, respectively, after a final iteration is performed.

* * * * *